(12) United States Patent
Ishizaka

(10) Patent No.: US 8,215,352 B2
(45) Date of Patent: Jul. 10, 2012

(54) PNEUMATIC TIRE

(75) Inventor: Takahide Ishizaka, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 814 days.

(21) Appl. No.: 12/260,792

(22) Filed: Oct. 29, 2008

(65) Prior Publication Data

US 2009/0114325 A1    May 7, 2009

(30) Foreign Application Priority Data

Nov. 2, 2007  (JP) ................................ 2007-286072

(51) Int. Cl.
*B60C 11/00* (2006.01)
*B60C 11/12* (2006.01)

(52) U.S. Cl. ............ 152/209.1; 152/209.12; 152/209.18

(58) Field of Classification Search ........................ None
See application file for complete search history.

(56) References Cited

U.S. PATENT DOCUMENTS

| | | | |
|---|---|---|---|
| 4,934,430 A | 6/1990 | Koseki et al. | |
| 5,711,829 A * | 1/1998 | Pollard et al. | 152/533 |
| 5,863,362 A * | 1/1999 | Creech | 152/527 |
| 6,415,834 B1 | 7/2002 | Carra et al. | |

FOREIGN PATENT DOCUMENTS

| | | |
|---|---|---|
| EP | 0 841 199 | 5/1998 |
| JP | 2-158402 | 6/1990 |
| JP | 05-077610 | 3/1993 |
| JP | 8-188017 | 7/1996 |
| JP | 08-282213 | 10/1996 |
| JP | 10-086613 | 4/1998 |
| JP | 10-211805 | 8/1998 |
| JP | 11-078433 | 3/1999 |
| JP | 2000-158916 | 6/2000 |
| JP | A 2000-168317 | 6/2000 |
| JP | 2001-187517 * | 7/2001 |
| JP | 2002-29221 * | 1/2002 |
| JP | 2004-161202 | 6/2004 |
| JP | 2007-1359 * | 1/2007 |
| JP | 2007-001359 | 1/2007 |
| JP | 2007-112217 | 5/2007 |

OTHER PUBLICATIONS

Machine translation of JP 2007-1359, 2009.*
Machine translation of JP 2001-187517, 2001.*

* cited by examiner

Primary Examiner — Justin Fischer
(74) *Attorney, Agent, or Firm* — Greer, Burns & Crain, Ltd.

(57) ABSTRACT

A pneumatic tire includes a wide cross belt having a width not smaller than 92% and not lager than 100% of a width of a tread; and a narrow cross belt having a width smaller than that of the wide cross belt and a tire width direction outer end positioned on a tire width direction outer side with respect to a tire width direction inner edge of an outermost land portion. The tread has open sipes penetrating through the outermost land portion in the tire width direction and formed along the tire circumferential direction, and lug grooves extending along the open sipes on a contact surface of the outermost land portion and having a tire width direction outer end positioned between a tire width direction outer end of the wide cross belt and the tire width direction outer end of the narrow cross belt.

6 Claims, 5 Drawing Sheets

FIG.6

| | CONVENTIONAL EXAMPLE 1 | CONVENTIONAL EXAMPLE 2 | COMPARATIVE EXAMPLE 1 | COMPARATIVE EXAMPLE 2 | EXAMPLE 1 | EXAMPLE 2 |
|---|---|---|---|---|---|---|
| OPEN SIPES ON LAND PORTION IN SHOULDER AREA | NO | YES | YES | YES | YES | YES |
| LUG GROOVE OUTER END POSITION | NO LUG GROOVE | NO LUG GROOVE | INNER SIDE WITH RESPECT TO CROSS BELT OUTER END | OUTER SIDE WITH RESPECT TO CROSS BELT INNER END | BETWEEN INNER AND OUTER ENDS OF CROSS BELTS | BETWEEN INNER AND OUTER ENDS OF CROSS BELTS |
| MAXIMUM BELT WIDTH RATIO [Wci/Wt] | 0.92 | 0.92 | 0.95 | 0.95 | 0.95 | 0.95 |
| LUG GROOVE DEPTH RATIO [d1/D] | — | — | 0.30 | 0.30 | 0.20 | 0.20 |
| LUG GROOVE WIDTH [mm] | — | — | 3.5 | 3.5 | 3.0 | 3.0 |
| OPEN SIPE DEPTH RATIO [d2/D] | — | 0.30 | 0.35 | 0.35 | 0.30 | 0.30 |
| MULTISIPE | NO | YES | NO | NO | NO | YES |
| OTHER OPEN SIPE | NO | YES | NO | NO | NO | YES |
| PERFORMANCE INDEX — UNEVEN WEAR RESISTANCE | 100 | 100 | 100 | 100 | 108 | 110 |
| PERFORMANCE INDEX — WET BRAKING PERFORMANCE | 100 | 103 | 103 | 105 | 105 | 110 |

PNEUMATIC TIRE

BACKGROUND OF THE INVENTION

1. Field of the Invention

The present invention relates to a pneumatic tire.

2. Description of the Related Art

In a pneumatic tire, specifically, a heavy-duty pneumatic tire mounted on a steering shaft, uneven wear occurs in a rib portion on a tread on a tire width direction outer side (in a shoulder area). The uneven wear occurring in the rib portion includes step wear, which results in a step extending from a circumferential main groove, due to toe-in, the camber, taking a sharp curve, or obliqueness of the road surface. Such an uneven wear occurring in the rib portion may interfere with vehicle handling.

In a conventional pneumatic tire, main grooves and ribs linearly extending in the tire circumferential direction are provided, and a shoulder rib on a tread on the outermost side in the tire width direction is not smaller than 1.35 and not larger than 1.6 of those of other ribs. In the conventional pneumatic tire, the linear main grooves and the linear ribs reduce the amount of uneven wear in each rib. In addition, by adjusting the ratio between the widths of the shoulder rib and other ribs in consideration of the rigidity of the shoulder rib, uneven wear is prevented from occurring in the shoulder rib. In the conventional pneumatic tire, to improve the wet braking performance even when the main grooves and the ribs linearly extending in the tire circumferential direction are provided, shallow narrow grooves extending in the tire width direction and sipes positioned on the groove bottoms of the narrow grooves are provided in each rib, and a total width of the sipes in the tire width direction each having a depth from the surface of the rib larger than 80% of that of the main groove is set to a width not smaller than 0.2 of the total width of the rib (see, for example, Japanese Patent Application Laid-open No. 2000-168317).

In the conventional pneumatic tire, while the ratio between the widths of the shoulder rib and the widths of other ribs is adjusted to optimize the rigidity of the shoulder rib and improve the uneven wear resistance, no consideration is paid for a belt layer in the tread. In a shoulder area, depending on the position of tire width direction outer ends (ends on the tire width direction outer sides) of the belt layer, the rigidity of the shoulder rib changes, which changes the uneven wear resistance. Therefore, in the pneumatic tire in which no consideration is paid for the belt layer, while the wet braking performance improves, the uneven wear resistance does not sufficiently improve.

SUMMARY OF THE INVENTION

It is an object of the present invention to at least partially solve the problems in the conventional technology.

A pneumatic tire according to an aspect of the present invention includes a tread that has a plurality of circumferential main grooves each extending in a tire circumferential direction and a plurality of land portions formed by the circumferential main grooves, the land portions including an outermost land portion formed on an outermost side in a tire width direction; a wide cross belt that has a width in the tire width direction not smaller than 92% and not lager than 100% of a width of the tread; a narrow cross belt that has a width in the tire width direction smaller than the width of the wide cross belt in the tire width direction, and that has a tire width direction outer end positioned on a tire width direction outer side with respect to an edge of the outermost land portion on a tire width direction inner side; and a carcass on which the wide cross belt and the narrow cross belt are formed on a tire radial direction outer side with respect to the carcass such that a cord of the wide cross belt and a cord of the narrow cross belt are oppositely oblique to the tire circumferential direction. The tread has a plurality of first open sipes that are formed along the tire circumferential direction such that each of the first open sipes penetrates through the outermost land portion in the tire width direction; and a plurality of lug grooves that extend along the first open sipes on a contact surface of the outermost land portion, each of the lug grooves having a tire width direction outer end positioned between a tire width direction outer end of the wide cross belt and the tire width direction outer end of the narrow cross belt.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a table of results of performance tests on pneumatic tires of Example of the pneumatic tire shown in FIG. 1.

DETAILED DESCRIPTION OF THE PREFERRED EMBODIMENTS

Exemplary embodiments of the present invention are explained in detail below with reference to the accompanying drawings. It should be noted that the present invention is not limited by the embodiments, constituents of the embodiments may include an element which is inherently replaceable while maintaining an identicalness of the present invention, and various modifications set forth in the embodiments can be arbitrarily combined within a scope inherently presented to those skilled in the art.

In the description below, "tire width direction" refers to the direction parallel to the rotation axis of a pneumatic tire, "tire width direction inner side" refers to the side of the equatorial plane in the tire width direction, and "tire width direction outer side" refers to the side apart from the equatorial plane in the tire width direction. "Tire radial direction" refers to the direction orthogonal to the rotation axis, "tire radial direction inner side" refers to the side of the rotation axis in the tire radial direction, and "tire radial direction outer side" refers to the side apart from the rotation axis in the tire radial direction. "Tire circumferential direction" refers to the direction of rotation on the rotation axis.

Figure 1:
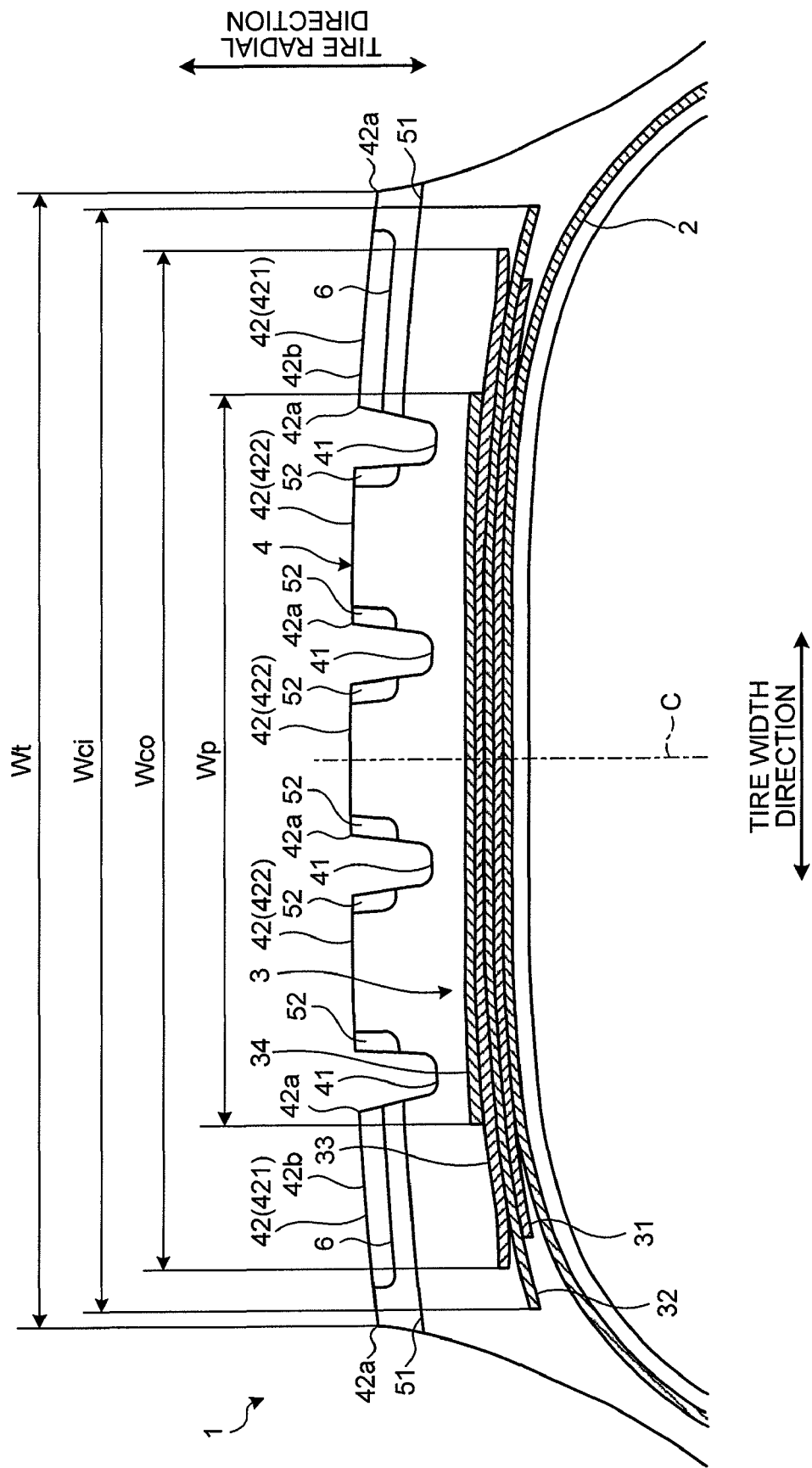
FIG. 1 is a cross sectional view of a pneumatic tire according to an embodiment of the present invention.
Figure 2:
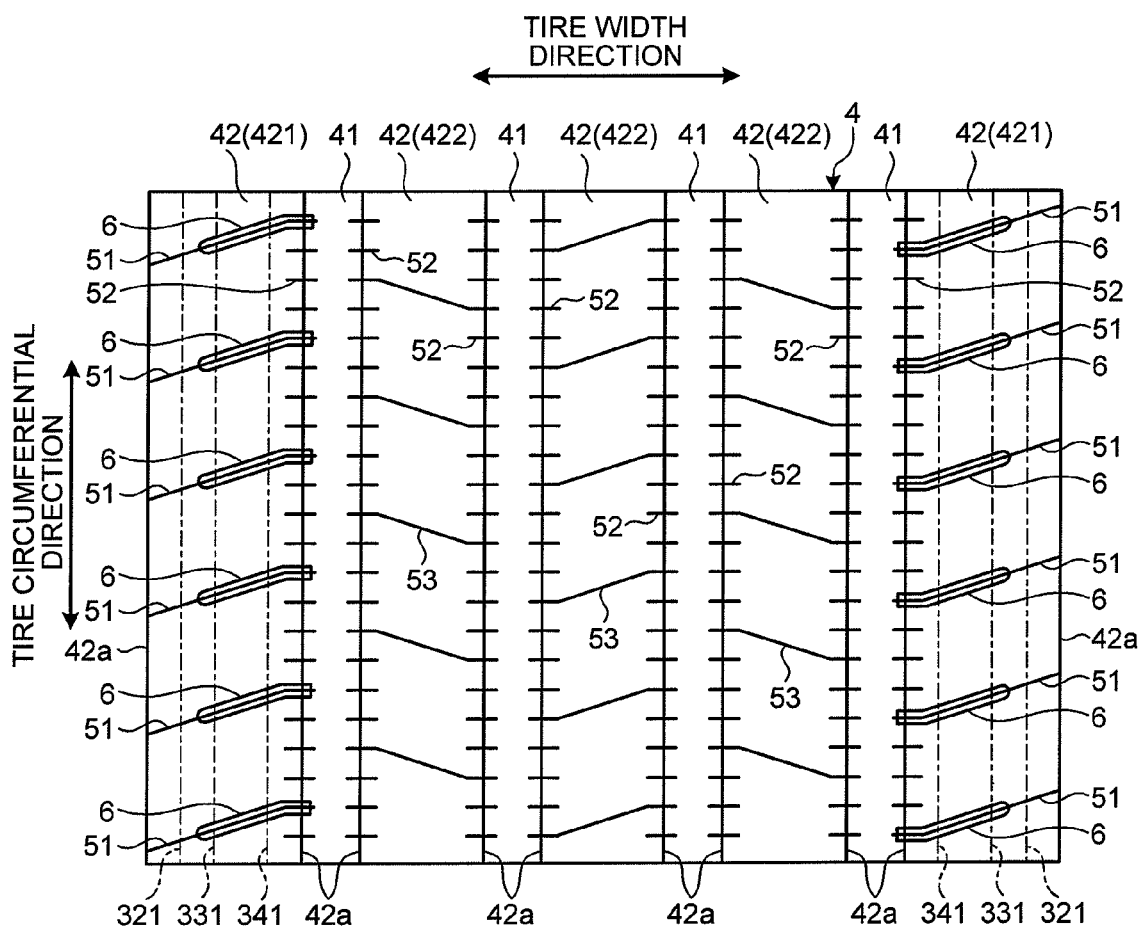
FIG. 2 is an exploded plan view of a part of a tread of the pneumatic tire shown in FIG. 1.
Figure 3:
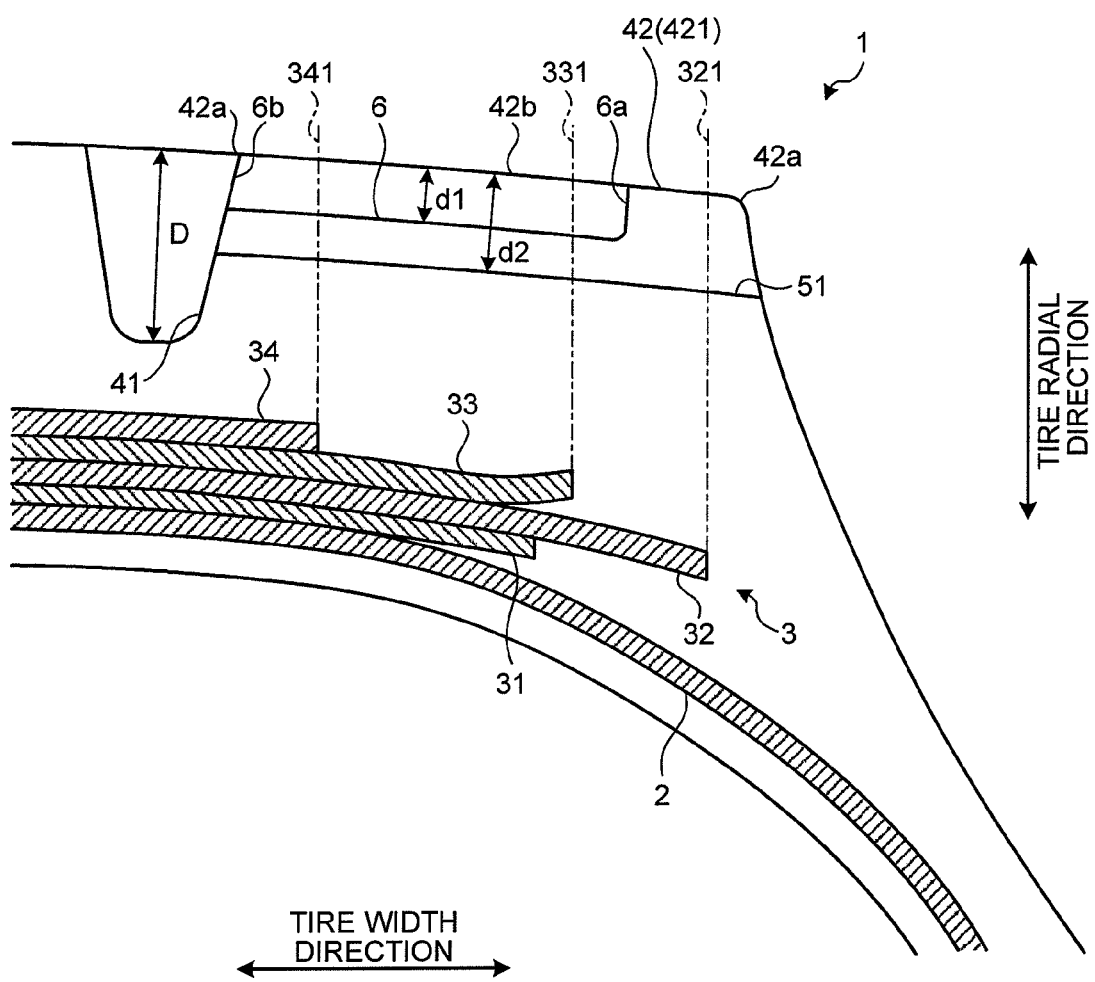
FIG. 3 is an enlarged view of a relevant portion of the pneumatic tire shown in FIG. 1.
Figure 4:
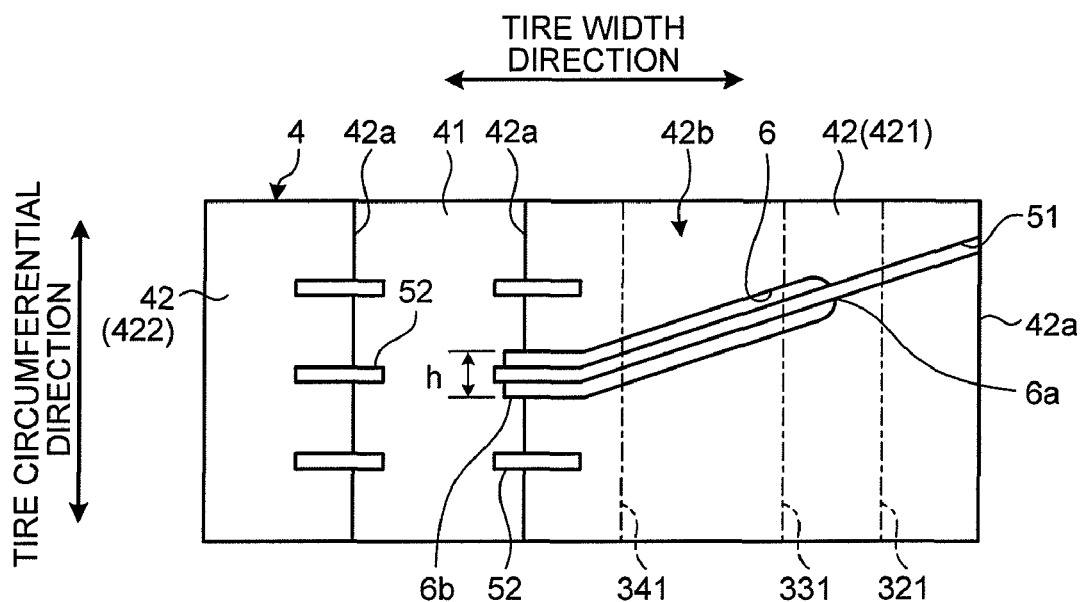
FIG. 4 is an enlarged view of a relevant portion of the tread shown in FIG. 2.
Figure 5:
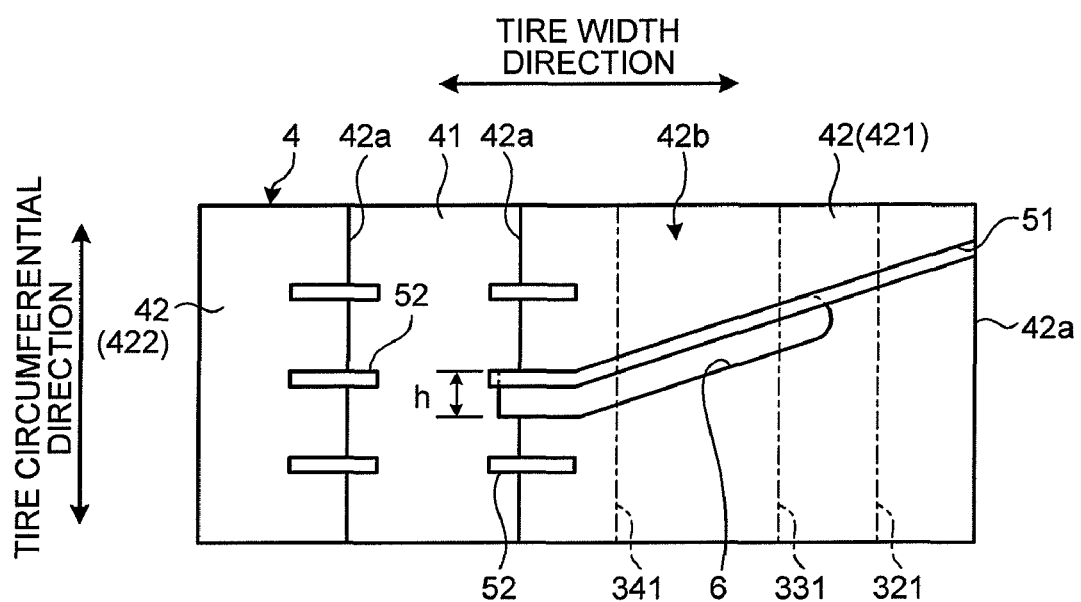
FIG. 5 is another enlarged view of the relevant portion of the tread shown in FIG. 2.

FIG. 1 is a cross sectional view of a pneumatic tire 1 according to an embodiment of the present invention. FIG. 2 is an exploded plan view of a part of a tread of the pneumatic tire shown in FIG. 1. FIG. 3 is an enlarged view of a relevant portion of the pneumatic tire shown in FIG. 1, and FIGS. 4 and 5 are enlarged views of a relevant portion of the tread shown in FIG. 2.

The pneumatic tire 1 is a heavy-duty pneumatic radial tire, and it includes a carcass 2 and a belt layer 3. The carcass 2 stretches across a pair of bead portions (not shown) in a toroidal shape, constituting a framework of the pneumatic tire 1. The belt layer 3 is a four-layered structure, and it includes a reinforcing belt 31, an inner cross belt 32, an outer cross belt 33, and a protection belt 34. The belt layer 3 is arranged on the tire radial direction outer side with respect to the carcass 2 and covers the carcass 2 in the tire circumferential direction. On the tire radial direction outer side with respect to the belt layer 3, a tread 4 made of a rubber material is arranged. The tread 4 is exposed to the outside of the pneumatic tire 1. The surface of the tread 4 forms the outline of the pneumatic tire 1. The tread 4 has, on its surface, a plurality of circumferential main grooves 41 extending in the tire circumferential direction and a plurality of land portions 42 sectioned by the circumferential main grooves 41. In the pneumatic tire 1, four circumferential main grooves 41 are formed and five land portions 42 (421, 422) each having a rib shape and formed by the circumferential main grooves 41 are formed.

The reinforcing belt 31, the inner cross belt 32, the outer cross belt 33, and the protection belt 34 of the belt layer 3 are sequentially superposed from the tire radial direction inner side to the tire radial direction outer side. In the belt layer 3, the reinforcing belt 31 is positioned on the most tire radial direction inner side. The reinforcing belt 31 is formed of belt cords buried in the rubber material and laid at an angle of, for example, 50 degrees to 60 degrees to the tire circumferential direction, i.e., to the tire equator line C shown in FIG. 1. The inner cross belt 32 and the outer cross belt 33 are positioned on the tire radial direction outer side with respect to the reinforcing belt 31. The inner cross belt 32 is formed of belt cords laid at an angle of, for example, 15 degrees to 30 degrees to the tire equator line C in the same direction in which the belt cords of the reinforcing belt 31 are oblique to the tire equator line C. The outer cross belt 33 is formed of belt cords laid at an angle of, for example, 15 degrees to 30 degrees to the tire equator line C in the direction opposite to the direction in which the belt cords of the inner cross belt 32 oblique to the tire equator line C. The protection belt 34 arranged on the tire radial direction outer side with respect to the outer cross belt 33 is formed of belt cords laid at an angle of, for example, 15 degrees to 30 degrees to the tire equator line C in the same direction in which the belt cords of the outer cross belt 33 are oblique to the tire equator line C.

A tire width direction maximum width $W_{ci}$ of the inner cross belt 32 and a width $W_t$ of the tread 4 (distance between edges 42a of the outermost land portions 421 of the land portions 42 formed on both outermost sides in the tire width direction (shoulder areas)) satisfies $0.92 \leq W_{ci}/W_1 \leq 1$, i.e., the tire width direction maximum width $W_{ci}$ is not smaller than 92% and not larger than 100% of the width $W_t$ of the tread 4. A tire width direction maximum width $W_{co}$ of the outer cross belt 33 is smaller than the tire width direction maximum width $W_{ci}$ of the inner cross belt 32, and a tire width direction outer end 331 of the outer cross belt 33 is positioned on the tire width direction outer side with respect to the edge 42a of the outermost land portion 421 on the tire width direction inner side. A tire width direction maximum width $W_p$ of the protection belt 34 is smaller than the tire width direction maximum width $W_{co}$ of the outer cross belt 33, and a tire width direction outer end 341 of the protection belt 34 is positioned on the tire width direction outer side with respect to the edge 42a of the outermost land portion 421 on the tire width direction inner side. As explained above, the inner cross belt 32 serves as a wide cross belt having a tire width direction width larger than that of the outer cross belt 33, and the outer cross belt 33 serves as a narrow cross belt having a tire width direction width smaller than that of the inner cross belt 32. Alternatively, the outer cross belt 33 can serve as a wide cross belt having a tire width direction width larger than that of the inner cross belt 32, and the inner cross belt 32 can serve as a narrow cross belt having a tire width direction width smaller than that of the outer cross belt 33. When at least three cross belts are provided, a cross belt having the largest tire width direction serves as a wide cross belt, and a cross belt adjacent to the wide cross belt and positioned on the tire radial direction outer side or the tire radial direction inner side serves as a narrow cross belt.

Open sipes 51 are formed on each of the outermost land portions 421 formed on the tire width direction outermost sides. The open sipe 51 is extremely narrow, and penetrates through the outermost land portion 421, i.e., extends from one of the edge 42a to the other along the tire width direction. The open sipes 51 are formed on the outermost land portion 421 along the tire circumferential direction. The open sipe 51 has a predetermined angle to the tire width direction. The bottom of the open sipe 51 curves along the curve of a contact surface 42b of the outermost land portion 421 serving as the surface of the tread 4. A depth d2 of the open sipe 51 is larger than a width d1 of a lug groove 6 to be explained below. In addition, the depth d2 and a depth D of the circumferential main groove 41 satisfies $0.2 \leq d2/D \leq 0.5$, i.e., the depth d2 of the open sipe 51 is not smaller than 20% and not larger than 50% of the depth D of the circumferential main groove 41 (see FIG. 3). Because $0.2 \leq d2/D \leq 0.5$ is satisfied, a contact pressure of the outermost land portion 421 in the shoulder area can be preferably equalized. It is preferable that the depth d2 of the open sipe 51 be larger than the depth d1 of the lug groove 6 to equalize the contact pressure of the outermost land portion 421 on which the lug groove 6 is formed. However, if the depth d2 of the open sipe 51 exceeds 50% of the depth D of the circumferential main groove 41, the rigidity of the outermost land portion 421 excessively decreases, which may cause heel-toe wear. For this reason, by setting the depth d2 of the open sipe 51 to a depth not smaller than 20% and not larger than 50% of the depth D of the circumferential main groove 41, the contact pressure of the outermost land portion 421 can be preferably equalized. The depth d2 of the open sipe 51 and the depth D of the circumferential main groove 41 are dimensions in the direction normal to the contact surface 42b of the tread 4 based on the edge 42a of the outermost land portion 421 (open edge of the circumferential main groove 41).

In addition to the open sipes 51, the lug grooves 6 are formed on each of the outermost land portions 421 formed on the tire width direction outermost sides on the tread 4. The lug groove 6 has a groove width larger than that of the open sipe 51, and expends along the open sipe 51 such that the center line of the lug groove 6 in which the lug groove 6 extends overlaps the center line of the open sipe 51 in which the open sipe 51 extends (see FIG. 4). A tire width direction outer end (end on the tire width direction outer side) 6a of the lug groove 6 is positioned between a tire width direction outer end 321 of the inner cross belt 32 and the tire width direction outer end 331 of the outer cross belt 33 in the tire width direction. A tire width direction inner end 6b of the lug groove 6 is open to the circumferential main groove 41. The bottom of the lug groove 6 curves along the curve of the contact surface 42b of the outermost land portion 421 serving as the surface of the tread 4. The depth d1 of the lug groove and depth D of the circumferential main groove 41 satisfies $0.15 \leq d1/D \leq 0.3$, i.e., the depth d1 is not smaller than 15% and not larger than 30% of the depth D of the circumferential main groove 41 (see FIG. 3). Because $0.15 \leq d1/D \leq 0.3$ is satisfied, uneven wear resistance is preferably achieved. If the depth d1 of the lug groove 6 is smaller than 15% of the depth D of the circumferential main groove 41, the effect of reducing step wear in the outermost land portion 421 in the shoulder area decreases. If the depth d1 of the lug groove 6 exceeds 30% of the depth D of the circumferential main groove 41, the rigidity of the outermost land portion 421 in the shoulder area excessively decreases, which may cause heel-toe wear in which the contact surface 42b of the outermost land portion 421 wears in a saw-like shape in the tire circumferential direction from the lug groove 6. For this reason, by setting the depth d1 of the lug groove 6 to a depth not smaller than 15% and not larger than 30% of the depth D of the circumferential main groove 41, the effect of reducing uneven wear can be preferably achieved. The depth d1 of the lug groove 6 is a dimension in the direction normal to the contact surface 42b of the tread 4 based on the edge 42a of the outermost land portion 421 (open edge of the circumferential main groove 41). A groove width h of the lug groove 6 in the direction orthogonal to the direction in which the lug groove 6 extends (see FIGS. 4 and 5) is not smaller than 2.0 millimeters and not larger than 4.0 millimeters. By setting the groove width h of the lug groove 6 to a width not smaller than 2.0 millimeters and not larger than 4.0 millimeters, the uneven wear resistance can be preferably achieved. If the groove width h of the lug groove 6 is smaller than 2.0 millimeters, the effect of reducing step wear in the outermost land portion 421 in the shoulder area decreases. If the groove width h of the lug groove 6 exceeds 4.0 millimeters, the rigidity of the outermost land portion 421 excessively decreases, which may cause heel-toe wear. For this reason, by setting the groove width h of the lug groove 6 to a width not smaller than 2.0 millimeters and not larger than 4.0 millimeters, the effect of reducing uneven wear is preferably achieved.

The lug groove 6 is not limited to the mode in which the tire width direction inner end 6b is open to the circumferential main groove 41. For example, the tire width direction inner end 6b can be positioned between the edge 42a of the outermost land portion 421 on the tire width direction inner side and the tire width direction outer end 331 of the outer cross belt 33 in the tire width direction. The lug groove 6 can be poisoned between the edge 42a of the outermost land portion 421 on the tire width direction inner side and the tire width direction outer end 341 of the protection belt 34 in the tire width direction. However, it is preferable that the tire width direction inner end 6b of the lug groove 6 be open to the circumferential main groove 41, because this mode achieves more excellent drainage performance and further improves the wet braking performance. The lug groove 6 extends along the open sipe 51. A part of the lug groove 6 can overlap the open sipe 51 on one side as shown in FIG. 5.

In the pneumatic tire 1, the tire width direction maximum width $W_{ci}$ of the inner cross belt (wide cross belt) 32 arranged on the tire radial direction inner side with respect to the outer cross belt 33 is not smaller than 92% and not larger than 100% of the width $W_t$ of the tread 4, the tire width direction maximum width $W_{co}$ of the outer cross belt (narrow cross belt) 33 positioned on the tire radial direction outer side with respect to the inner cross belt 32 is smaller than the tire width direction maximum width $W_{ci}$ of the inner cross belt 32, and the tire width direction outer end 331 of the outer cross belt 33 is positioned on the tire width direction outer side with respect to the edge 42a of the outermost land portion 421 on the tire width direction inner side formed on the tire width direction outermost side (shoulder area). On the outermost land portion 421, the open sipes 51 are formed in the tire circumferential direction such that the open sipes 51 penetrate through the outermost land portion 421 along the tire width direction. On the outermost land portion 421, the lug grooves 6 are formed such that the lug grooves 6 extends along the respective open sipes 51 and the tire width direction outer end 6a is positioned between the tire width direction outer end 321 of the inner cross belt 32 and the tire width direction outer end 331 of the outer cross belt 33 in the tire width direction. In the outermost land portion 421, the open sipes 51 equalizes the contact pressure to the road surface and the lug grooves 6 relatively reduces the rigidity in the area on the tire width direction inner side with respect to the tire width direction outer ends 321 and 331 of the inner cross belt 32 and the outer cross belt 33, which achieves equal rigidity in the tire width direction. As a result, step wear in the outermost land portion 421 in the shoulder area can be reduced, which improves the uneven wear resistance. Furthermore, the open sipes 51 and the lug grooves 6 achieve excellent drainage performance, which improves the wet braking performance.

In the pneumatic tire 1, as shown in FIGS. 1, 2, 4, and 5, a plurality of multisipes 52 are formed on each of the edges 42a of the circumferential main groove 41 formed on the tire width direction outermost side on both sides of the circumferential main groove 41 in the tire width direction. This reduces uneven wear (river wear) in the ridge line of the edge 42a, which improves uneven wear resistance. In addition, in the pneumatic tire 1, the multisipes 52 are formed also on each of the edges 42a (422) of the circumferential main grooves 41 other than the circumferential main grooves 41 (421) formed on the tire width direction outermost side on both sides of the circumferential main groove 41 in the tire width direction, which reduces uneven wear (river wear) in the edges 42a.

In the pneumatic tire 1, as shown in FIG. 2, a plurality of open sipes 53 are formed on each land portion 422 different from the outermost land portions 421 formed on the tire width direction outermost sides on the tread such that the open sipes 53 penetrate through the land portion 422 along the tire width direction. The open sipes 53 achieves excellent drainage performance and improves the wet braking performance of the tread 4.

FIG. 6 is a table of results of performance tests performed on pneumatic tires of Examples of the pneumatic tire 1 according to the embodiment of the present invention. Examples of the pneumatic tire 1 were made, and the pneumatic tire and conventional pneumatic tires underwent performance tests for evaluating the tires regarding uneven wear resistance (uneven wear performance) in the shoulder area and wet braking performance. In each performance test, a pneumatic tire in a tire size of 295/80R22.5 was mounted on an applicable rim defined by Japan Automobile Tyre Manufacturers Association (JATMA), the pneumatic tire was applied with the maximum load and the maximum air pressure defined by the JATMA, and the pneumatic tire was mounted on a steering shaft of the front of a 2-D4-type test vehicle.

Uneven wear resistance was evaluated in the following manner. The vehicle in which pneumatic a tire is installed traveled a test course of 60,000 kilometers. Thereafter, the amount of uneven wear ([width in tire width direction]× [depth]) occurring in the contact surface 42b of the outermost land portion 421 in the shoulder area was measured, and the amount of uneven wear on the circumference of the tire circumferential direction was represented as an index. The uneven wear resistance was evaluated based on the index, using the result of evaluating a conventional pneumatic tire as an index of 100. The larger the index is, the more the uneven wear resistance is excellent.

Wet braking performance was evaluated in the following manner. A braking distance on the surface of an asphalt road with a predetermined water depth from the speed of 60 km/h was measured for at least three times, and an average value obtained from the measured braking distances is represented as an index using the result of evaluating the conventional pneumatic tire as an index of 100. The larger the index is, the more the wet braking performance is excellent.

Specifically, as shown in FIG. 6, two types of pneumatic tires as Example 1 and Example 2 of the pneumatic tire 1 according to the embodiment of the present invention and two types of pneumatic tires as Conventional Example 1 and Conventional Example 2 to be compared with Examples 1 and 2 underwent the above test. In the pneumatic tire of Example 1, the open sipes 51 and the lug grooves 6 are formed and the tire width direction outer end 6a of the lug groove 6 is positioned between the tire width direction outer end 321 of the inner cross belt 32 and the tire width direction outer end 331 of the outer cross belt 33 in the tire width direction. The pneumatic tire of Comparative example 2 includes the multisipes 52 and the open sipes 53, which are not formed in the pneumatic tire of Example 1. Each of the pneumatic tires of Comparative examples 1 and 2 has the open sipes 51 and the lug grooves 6. Meanwhile, in the pneumatic tire of Comparative example 1, the tire width direction outer end 6a of the lug groove 6 is positioned on the tire width direction inner side with respect to the tire width direction outer end 331 of the outer cross belt 33 in the tire width direction. In the pneumatic tire of Comparative Example 2, on the other hand, the tire width direction outer end 6a of the lug groove 6 is positioned on the tire width direction outer side with respect to the tire width direction outer end 321 of the inner cross belt 32. Each of the pneumatic tires of Examples 1 and 2 does not have the multisipes 52 and the open sipes 53. Each of the pneumatic tires of Conventional examples 1 and 2 does not have the open sipes 51 and the lug grooves 6. The pneumatic tire of Conventional example 2 has the multisipes 52 and the open sipes 53. The pneumatic tire of Conventional example 1 does not have the multisipes 52 and the open sipes 53.

As it is clearly shown in FIG. 6, in the pneumatic tires of Comparative Examples 1 and 2 each having the open sipes 51 and the lug grooves 6, while the wet braking performance improves compared with the pneumatic tire of Conventional Example 1 not having the open sipes 51 and the lug groove 6, the uneven wear resistance does not improve compared with the pneumatic tire of Conventional Example 2. In addition, the wet braking resistance and the uneven wear resistance of each of the pneumatic tires of Comparative Examples 1 and 2 do not improve compared with the pneumatic tire of Conventional Example 2 having the multisipes 52 and the open sipes 53.

On the other hand, the pneumatic tire of Example 1 in which the open sipes 51 and the lug grooves 6 are formed and the tire width direction outer end 6a of the lug groove 6 is positioned between the tire width direction outer end 321 of the inner cross belt 32 and the tire width direction outer end 331 of the outer cross belt 33, both the wet braking performance and the uneven wear resistance improve. In the pneumatic tire of Example 2, the wet braking performance and the uneven wear resistance further improve because the multisipes 52 and the open sipes 53 are additionally formed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pneumatic tire comprising:
    a tread that has a plurality of circumferential main grooves each extending in a tire circumferential direction and a plurality of land portions formed by the circumferential main grooves, the land portions including an outermost land portion formed on an outermost side in a tire width direction;
    a wide cross belt that has a width in the tire width direction not smaller than 92% and not larger than 100% of a width of the tread;
    a narrow cross belt that has a width in the tire width direction smaller than the width of the wide cross belt in the tire width direction, and that has a tire width direction outer end positioned on a tire width direction outer side with respect to an edge of the outermost land portion on a tire width direction inner side; and
    a carcass on which the wide cross belt and the narrow cross belt are formed on a tire radial direction outer side with respect to the carcass such that a cord of the wide cross belt and a cord of the narrow cross belt are oppositely oblique to the tire circumferential direction,
    wherein the tread has a plurality of first open sipes that are formed along the tire circumferential direction such that each of the first open sipes penetrates through the outermost land portion in the tire width direction; and a plurality of lug grooves that extend along the first open sipes on a contact surface of the outermost land portion, each of the lug grooves having a tire width direction outer end positioned between a tire width direction outer end of the wide cross belt and the tire width direction outer end of the narrow cross belt,
    wherein a depth d2 of the first open sipe from the contact surface of the outermost land portion is larger than a depth of the lug groove from the contact surface of the outermost land portion, and
    the depth d2 and a depth D of the circumferential main groove satisfy $0.2 \leq d2/D \leq 0.5$.

2. The pneumatic tire according to claim 1, wherein the lug groove has a tire width direction inner end that is open to the circumferential main groove.

3. The pneumatic tire according to claim 1, wherein a depth d1 of the lug groove from the contact surface of the outermost land portion and a depth D of the circumferential main groove satisfy $0.15 \leq d1/D \leq 0.3$.

4. The pneumatic tire according to claim 1, wherein a groove width of the lug groove is not smaller than 2.0 millimeters and not larger than 4.0 millimeters.

5. The pneumatic tire according to claim 1, wherein
    the tread has a plurality of sipes that are formed along the tire circumferential direction on each of the edges of the outermost land portion on the tire width direction inner side and a tire width direction outer side.

6. The pneumatic tire according to claim 1, wherein the tread has a plurality of second open sipes that are formed on each of the land portions other than the outermost land portion such that each of the second open sipes penetrates through the land portion along the tire width direction.

* * * * *